April 29, 1969 W. J. COLE 3,441,854
ENCODER-DECODER CIRCUIT INCLUDING DIODE SWITCHING OF A STAGE FROM AN AMPLIFIER TO AN OSCILLATOR
Filed March 31, 1966
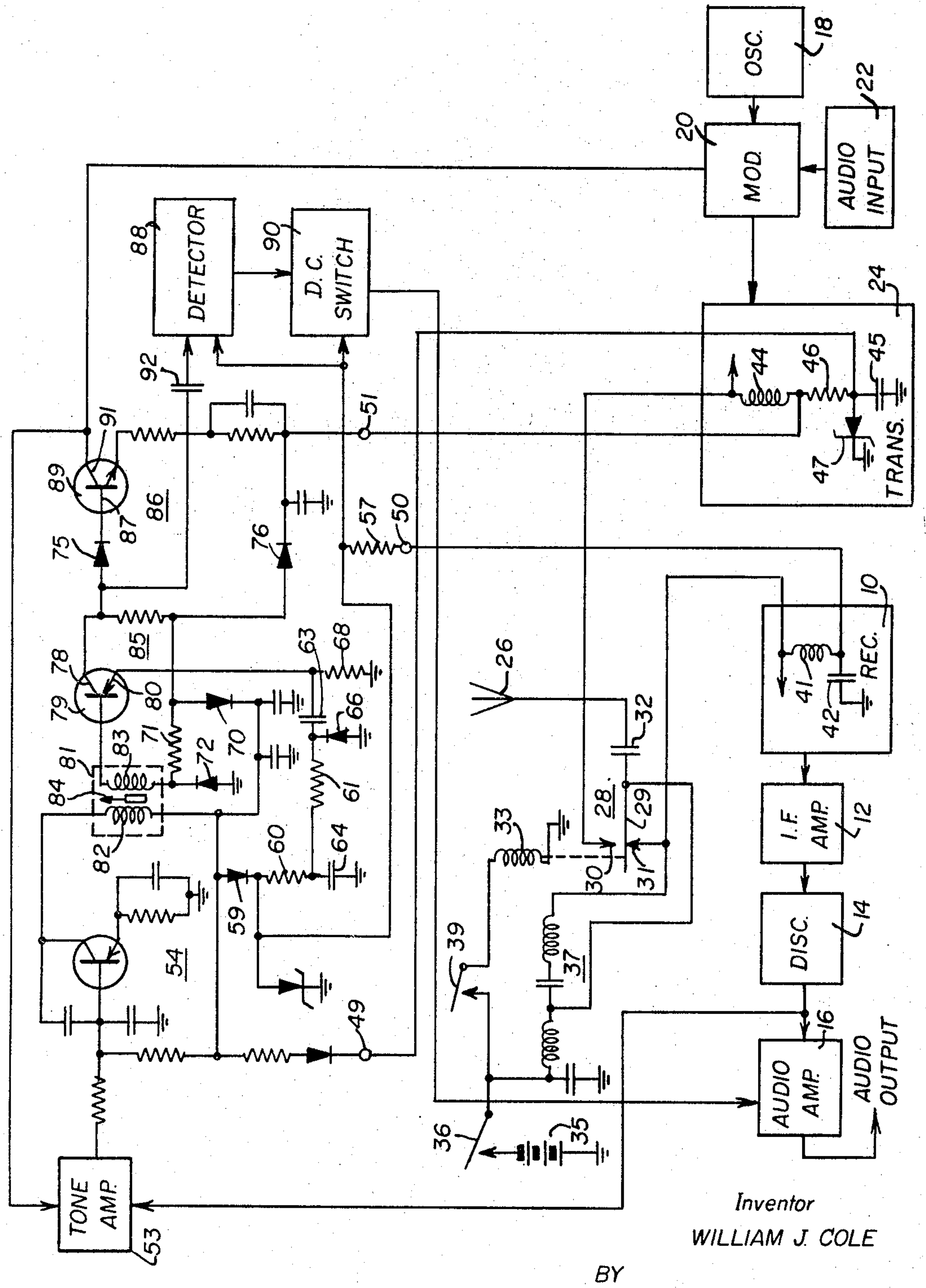
Inventor
WILLIAM J. COLE
BY
Mueller, Aichele & Rauner
ATTYS.

United States Patent Office 3,441,854
Patented Apr. 29, 1969

3,441,854
ENCODER-DECODER CIRCUIT INCLUDING DIODE SWITCHING OF A STAGE FROM AN AMPLIFIER TO AN OSCILLATOR

William J. Cole, Arlington Heights, Ill., assignor to Motorola, Inc., Franklin Park, Ill., a corporation of Illinois Filed Mar. 31, 1966, Ser. No. 539,026
Int. Cl. H04b 1/40
U.S. Cl. 325—18 12 Claims

ABSTRACT OF THE DISCLOSURE

A tone signal encoder-decoder circuit uses an amplifier and a single tuned circuit for decoding or encoding a tone signal. A switching network enables a feedback circuit to cause operation of the circuit as an encoder and disables the feedback circuit to cause operation as a decoder. The switching circuit also changes the gain levels of the amplifier in order to prevent distortion. The amplifier includes degenerative feedback circuit for regulating gain. A bypass for the degenerative feedback circuit is provided for decoding and disabled for encoding. The disabling of the bypass circuit for encoding is delayed in order to provide a rapid start for the encoding oscillator circuit.

The development of transistors and other semiconductor devices has made possible the miniaturization of electronic devices. Using these new devices, it is possible to construct a handheld miniature transmitter-receiver incorporating all of the features of much larger transmitter receiver circuits. Among the features which may be incorporated in a transmitter-receiver of this type, is a squelch system which maintains the audio portion of the receiver cut off until a carrier signal is received by the receiver. Another feature which may be incorporated in the transmitter-receiver is a second squelch system which maintains the audio portion of the receiver circuitry in an off condition until a carrier modulated by a tone of a particular frequency is received. By using different tones for different receivers, it is possible for a transmitter operator to select particular receivers and only the selected receivers, among those receivers equipped with the two squelch system, will be capable of picking up the transmitted message. Thus, a receiver operator will not have to listen to all the traffic transmitted on a particular frequency but will only receive those messages addressed to his particular receiver.

The ability to modulate the carrier frequency with a particular tone is also desirable for the transmitter portion of the miniature handheld transmitter-receiver so that another station listening to the handheld receiver will be energized only if it is the desired receiver.

The tone operated squelch system has been incorporated in prior art transmitter-receivers by the use of a single circuit as both the encoder and decoder circuit. When operating as a decoder circuit, the detected tone signal is coupled to a frequency selective circuit which produces an output only if the tone signal is of the predetermined frequency. The output signal from the frequency selective circuit is coupled to the audio portion of the receiver to energize the audio portion. When operating as an encoder, the output circuit from the frequency selective circuit is coupled back to the input of the frequency selective circuit to form a feedback oscillator. Thus, it is necessary to switch the signal paths in the encoder-decoder portion depending upon the circuit operation desired.

When the encoder-decoder circuit is operating as a decoder, it is desirable that the gain of the circuit be as high as possible. When operating as an encoder, it is important that the gain of the circuit be reduced to a point where no distortion is generated in the encoder when it acts as an oscillator. However, when the encoder is initially energized, the gain should be high so that oscillations will start. After oscillation starts, the gain should be reduced in order to minimize distortion. In order to obtain the desired output signals from a single circuit acting as an encoder and a decoder, it is necessary that additional switching be carried out in the encoder-decoder circuit. In order to maintain the small size required for a miniature handheld transmitter-receiver, a minimum number of switching components should be used and they should be as small as possible.

It is, therefore, an object of this invention to provide an improved tone signal encoder-decoder circuit for a transmitter-receiver in which no additional mechanical switches are required.

Another object of this invention is to provide a tone signal encoder-decoder circuit for a transmitter-receiver in which the gain of the circuit is reduced during encoder operation in order to prevent tone signal distortion.

Another object of this invention is to provide a tone signal encoder-decoder circuit for a transmitter-receiver in which the gain of the circuit during encoder operation is initially high to insure the starting of oscillation and wherein the gain is reduced after oscillation starts.

A feature of this invention is the provision of a tone signal encoder-decoder circuit for a transmitter-receiver in which diode switching alternately couples the encoder-decoder circuit to the transmitter and receiver portions for changing the potential supplied to the stages of the tone signal encoder-decoder circuit during encoding and decoding operation.

Another feature of this invention is the provision of a tone signal encoder-decoder circuit for a transmitter-receiver in which a degenerative feedback circuit is provided to lower the gain of an amplifier stage to reduce distortion in the output signal.

Another feature of this invention is the provision of a tone signal encoder-decoder circuit for a transmitter-receiver in which the degenerative feedback circuit is bypassed during the initial starting period of the oscillator circuit.

The invention is illustrated in the single drawing; a partial block diagram and partial schematic of the circuit incorporating the features of the invention.

In practicing this invention, a transmitter-receiver is provided which includes a power supply and switching means for alternately coupling the power supply to the transmitter or the receiver for the desired operation of the transmitter-receiver. The transmitter includes a modulator circuit and the receiver includes an audio amplifier circuit, which normally biased to be inoperative, and a discriminator circuit coupled to the audio amplifier circuit. The discriminator circuit is adapted to develop tone signals in response to input signals applied thereto.

In the encoder-decoder circuit tone frequency selective means are provided having an input circuit coupled to the discriminator for receiving the tone signals therefrom and an output circuit. Feedback amplifier circuit means are provided having an output circuit coupled to the input circuit of the tone frequency selective means. Diode means couple the output circuit of the tone frequency selective means to the feedback amplifier circuit means. Detector circuit means couple the output circuit of the tone frequency selective means to the audio amplifier. First bias circuit means couple the receiver to the tone frequency selective means and the detector means for furnishing operating voltages thereto with the switching means operative to couple the power supply to the receiver. The first bias circuit further acts to apply a bias voltage to the diode means to block the particular tone signal from the feedback amplifier.

In decoder operation, the tone frequency selective means is responsive to a particular tone signal received from the discriminator to amplify the same. The detector circuit is responsive to the amplified tone signal to develop a bias voltage which is applied to the audio amplifier and biases the audio amplifier to be operative.

A second bias circuit couples the transmitter to the tone frequency selective means and the feedback amplifier means and furnishes operating voltages thereto with the switching means operative to couple the power supply to the transmitter. The second bias circuit means also applies a bias voltage to the diode means to permit the particular tone signal to be coupled to the feedback amplifier means. The particular tone frequency signal is fed back from the feedback amplifier means to the input circuit of the tone frequency selective means thus forming an oscillator circuit which develops a particular output tone signal of a desired frequency. The particular output tone signal is coupled to the modulator to modulate the output signal from the transmitter.

The output circuit of the tone frequency selective means may include an amplifier having a degenerative feedback circuit for reducing the gain of the amplifier. A circuit bypassing the degenerative feedback means is also included and the operating voltages furnished by the first bias circuit means acts to bias the bypass path to conduction so that the degenerative feedback circuit is inoperative during receiver operation. During transmitter operation, the bias voltage is removed to render the bypass path inoperative whereby the degenerative feedback circuit acts to reduce the gain of the amplifier. A capacitor is included in the feedback circuit and is charged during receiver operation. When the transmitter-receiver is switched to transmitter operation, the charge on the capacitor maintains the bypass circuit conductive for a time duration sufficient to cause oscillation to start. Thus, during the oscillation starting period, the gain of the amplifier is high so that oscillator starting is insured. The charge on the capacitor is quickly reduced during transmitter operation so that the bypass path is no longer conductive and the degenerative feedback circuit acts to reduce the gain of the amplifier.

Referring to the figure, there is shown a receiver circuit 10 in which carrier frequency signals are received and changed by means well known in the art to intermediate frequency signals which are amplified in intermediate frequency amplifier 12. The intermediate frequency signals from intermediate frequency amplifier 12 are coupled to discriminator 14 where audio signals, including tone signals, are detected. The output signals from discriminator 10 are coupled to audio amplifier 16 and from there to the audio output of the receiver. Audio amplifier 16 is normally biased to be inoperative except during the receipt of a particular tone signal which acts to bias audio amplifier 16 to be operative in a manner which will be described in a subsequent portion of the specification.

When operating as a transmitter, oscillator 18 generates radio frequency signals which are coupled to a modulator 20. An audio input signal from audio input circuit 22 is also coupled to modulator 20 to modulate the radio frequency signal. The output of moduator 20 is coupled to the transmitter portion 24 where it may be further amplifier and increased in frequency in a manner well known in the art.

When operating as a receiver, signals received on antenna 26 are coupled through capacitor 32 and transmit-receive switch 28 to receive portion 10. Receiver operating voltages are furnished from power supply 35 through on-off switch 36, filter 37 through contacts 29 and 31 to receiver portion 10. The direct current supply voltage is separated from the carrier frequency signals by a filter consisting of inductance 41 and capacitance 42. This potential is used throughout the receiver portion and is also coupled to terminal 50 of the encoder-decoder circuit portion to supply operating voltages thereto during receiver operation.

During transmitter operation, push-to-talk switch 39 is closed, energizing push-to-talk relay 33. With push-to-talk relay 33 energized, carrier signals from transmitter 24 are coupled through contacts 30 and 29 and capacitor 32 to antenna 26 where they are radiated. The supply potential for transmitter operation is coupled from the power supply 35 through on-off switch 36, filter 37, switch contacts 29 and 30 to transmitter 24. The direct current supply voltage is separated from the carrier frequency signals by means of a filter consisting of inductance 44 and capacitance 45. In the transmitter portion, two direct current voltages are shown one of which is the supply voltage from power supply 35 and the other is a supply voltage which is regulated by means of resistor 46 and Zener diode 47. The regulated voltage is coupled to terminal 49 of the encoder-decoder circuit and the unregulated voltage is coupled to terminal 51 of the encoder-decoder circuit.

The encoder-decoder circuit includes a tone amplifier 53 coupled to discriminator 14. Tone frequency selective means are provided for distinguishing between different tone signals and includes an input amplifier 54, a tone filter 81 and an output amplifier 85. Output amplifier 85 is coupled to detector 88 through capacitor 92 and to feedback amplifier 86 through diode 75. The DC switch 90 couples detector 88 to audio amplifier 16. The output of feedback amplifier 86 is coupled to tone amplifier 53 and to modulator 20.

During receiver operation, the supply potential supplied to terminal 50 is coupled through resistor 57 to furnish operating voltages for detector 88 and DC switch 90 and through diode 59 to furnish operating voltage for tone amplifier 53, the input circuit of the tone frequency selective means and amplifier 54. Operating potentials are supplied through diodes 59 and 70 to bias transistor 79, and through resistor 71 to bias diode 72 to conduction. The operating voltages supplied through diodes 59 and 70 to bias transistor 79 also act to reverse bias diodes 75 and 76 thereby preventing any signals from being coupled to feedback amplifier 86.

In operation as a receiver, tone signals detected by discriminator 14 are coupled through tone amplifier 53 and amplified. The output of tone amplifier 53 is further amplified in input amplifier circuit 54 and coupled to reed filter 81. Tone signals of the desired frequency coupled to coil 82 of reed filter 81 act to cause mechanical vibrations of reed 84 thus coupling energy to the output coil 83. Tone signals which are not of the desired frequency are highly attenuated by reed filter 81 and are not coupled to the output coil 83. The output of reed filter 81 is coupled to output amplifier circuit 85 for further amplification and the output of output circuit amplifier 85 is coupled to detector 88 and DC switch 90 to develop a direct current bias signal. Direct current bias signals applied to audio amplifier 16 from DC switch 90 cause audio amplifier 16 to be biased to be operative thereby allowing audio signals from discriminator 14 to be coupled to the audio output circuits of the receiver.

During transmitter operation, bias voltages are applied to terminals 49 and 51 and there is no voltage on terminal 50. The voltage coupled to terminal 49 furnishes the operating voltages for tone amplifier 53 and input amplifier circuit 54. The voltage coupled to terminal 51 provides operating voltages for output amplifier circuit 85. feedback amplifier 86 and also biases diodes 75 and 76 to conduction. An operating potential is applied through diode 76 and resistor 71 to diode 72 to bias diode 72 to conduction. With diode 75 biased to conduction, tone signals appearing at collector 78 of transistor 79 are coupled to base 87 of transistor 89 through diode 75.

Output tone signals appearing at collector 91 of transistor 89 are coupled back to tone amplifier 53 where they are further amplified and applied to input amplifier circuit 54. Thus, tone amplifier 53, input amplifier circuit 54, reed filter 81, output amplifier circuit 85 and feedback amplifier 86 form an oscillator circuit which develops an output tone signal having the frequency to which reed filter 81 is tuned. The output signal is coupled from collector 91 of transistor 89 to modulator 20 to modulate the carrier frequency signal of the transmitter.

In receiver operation, it is desired to have the gain of the encoder-decoder circuit as high as possible in order that a sufficiently strong signal will be generated to bias audio amplifier 16 to be operative. However, when the transmitter-receiver is operating as a transmitter, the encoder-decoder circuit operates as an oscillator and the gain of the oscillator must be limited to prevent distortion. In order to limit the gain of the oscillator circuit, a degenerative feedback resistor is coupled from emitter 80 of transistor 79 to a reference potential. Resistor 68 acts to reduce the gain of amplifier transistor 79 thus reducing the overall gain of the oscillator circuit. A bypass path across resistor 68 is provided by capacitor 63 in series with diode 66.

During receiver operation, the potential supplied from terminal 50 through resistors 60 and 61 acts to bias diode 66 to conduction thereby providing a bypass path for the degenerative feedback resistor 68 through capacitor 63 and diode 66. Thus, during receiver operation the feedback resistor 68 is not operative to reduce the gain and the gain of amplifier 79 is maintained at a high value. During receiver operation, with diode 66 biased to conduction, capacitor 63 is charged to a potential sufficiently high to maintain diode 66 in conduction. When the encoder-decoder circuit is switched to oscillator operation, the charge on capacitor 63 acts to maintain diode 66 in conduction during the starting period of the oscillator circuit thereby maintaining the gain of output amplifier 85 at a high value during this starting period. The charge on capacitor 63 is discharged through diode 66 reducing the bias on diode 66 until diode 66 is substantially non-conductive. With diode 66 non-conductive, feedback resistor 68 acts to reduce the gain of output amplifier 85 to a value whereby distortion of the output signal from feedback amplifier circuit 86 is minimized.

If it is desired to increase the time duration of the period during which diode 66 conducts and provide a bypass path for degenerative feedback resistor 68, additional capacitance in the form of capacitor 64 may be included. Capacitor 64 charges during receiver operation and acts to provide additional bias current for diode 66 to maintain diode 66 in conduction after the removal of the bias voltage from terminal 50.

The operating potential applied to terminal 49 is lower than the potential applied to terminal 50 and, thus, during transmitter operation, the bias voltages of tone amplifier 53 and input amplifier 54 are reduced over those present during receiver operation. Reduction of the bias voltages reduces the gain of tone amplifier 53 and input amplifier 54 to minimize distortion of the signal developed when the encoder-decoder circuit acts as an oscillator.

Thus, an encoder-decoder circuit for use in a miniature handheld transmitter-receiver has been described. The circuit uses diode switching to insure that the proper operating voltages are applied therein to meet the different requirements of the encoding and decoding operations. In addition, a quick starting circuit for an oscillator has been provided which includes an amplifier circuit having an initially high gain to insure quick starting. The gain is reduced after oscillation starts to prevent distortion of the signal developed by the oscillator.

I claim:

1. A tone signal encoder-decoder circuit for a transmitter-receiver having a power supply and switching means for alternately coupling the power supply to the transmitter and the receiver, the transmitter including a modulator circuit and the receiver including an audio amplifier circuit, which is normally biased to be inoperative, and a discriminator circuit coupled to the audio amplifier circuit and adapted to develop tone signals in response to input signals applied thereto, said tone signal encoder-decoder circuit including in combination, tone frequency selective means having an input circuit coupled to the discriminator circuit for receiving the tone signals therefrom and an output circuit, feedback amplifier means having an output circuit coupled to said input circuit of said tone frequency selective means and the modulator, first diode means coupling said output circuit of said tone frequency selective means to said feedback amplifier means, detector circuit means coupling said output circuit of said tone frequency selective means to the audio amplifier circuit, first bias circuit means coupled to the receiver and further being coupled to said tone frequency selective means and said detector means for furnishing operating voltages thereto with the switching means operative to couple the power supply to the receiver, said tone frequency selective means being responsive to a particular tone signal to select and amplify the same, said detector circuit means being responsive to said amplified particular tone signal to develop a first bias voltage therefrom and to apply said first bias voltage to the audio amplifier to bias the same to be operative, said first bias circuit means further being coupled to said first diode means to apply a second bias voltage thereto to reverse bias the same whereby said particular tone signal is blocked from said feedback amplifier means, second bias circuit means coupled to the transmitter and further being coupled to said tone frequency selective means, and said feedback amplifier means for furnishing operating voltages thereto with the switching means operative to couple the power supply to the transmitter, said second bias circuit means further being coupled to said first diode means to apply a third bias voltage thereto whereby said amplified particular tone signal is applied to said feedback amplifier means, said tone frequency selective means and said feedback amplifier means acting to form an oscillator circuit to develop said particular tone signal and couple the same to the modulator, whereby the output signal from the transmitter is modulated by the particular tone signal.

2. The tone signal encoder-decoder circuit of claim 1 and further including third bias circuit means coupled to the transmitter and to said input circuit means of said tone frequency selective means for furnishing an operating voltage thereto with the switching means operative to couple the power supply to the transmitter, said voltage supplied by said third bias circuit means acting to decrease the gain of said input circuit means of said tone frequency selective means during the transmission of the tone signal whereby distortion of the tone signal is reduced.

3. The tone signal encoder-decoder circuit of claim 2 wherein said tone frequency selective means includes a contactless, resonant reed filter unit having input circuit means coupled to said input circuit of said tone frequency selective means and output circuit means coupled to said output circuit of said tone frequency selective means, said filter unit being responsive to said particular tone signal applied to said input circuit thereof to develop an output signal in said output circuit thereof.

4. The tone signal encoder-decoder circuit of claim 2 wherein said input circuit of said tone frequency selective means includes a first amplifier coupled to the discriminator and a second amplifier coupled to said first amplifier and further coupled to said input circuit of said tone frequency selective means, said first bias circuit means being coupled to said first and second amplifiers for furnishing first operating voltages thereto with the power supply coupled to the receiver, said third bias circuit means being coupled to said first and second amplifiers for furnishing second operating voltages thereto with the power supply coupled to the transmitter, said second operating voltages acting to reduce the gain of said second tone amplifier whereby distortion in said particular tone signal produced by said oscillator circuit is reduced to a minimum.

5. The tone signal encoder-decoder circuit of claim 1 wherein said output circuit of said tone frequency selective means includes output amplifier means having degenerative feedback circuit means coupled thereto, capacitor means and second diode means coupled in series across said degenerative feedback means to provide a bypass circuit therefore, circuit means coupling said first bias circuit means to said capacitor means and said second diode means, said operating voltages furnished by said first bias circuit means with the power supply coupled to the receiver acting to bias said second diode means to conduction and to charge said capacitor means whereby said degenerative feedback means is effectively bypassed, said charge on said capacitor means acting to maintain said second diode means conductive during the starting period of the oscillator circuit with the switching means coupling the power supply to the transmiter and said operating voltages furnished by said first bias circuit means are removed from said second diode means, said capacitor means discharging through said second diode means whereby said second diode means is rendered non-conductive and said degenerative feedback circuit means is unbypassed, said unbypassed degenerative feedback circuit means acting to reduce the gain of said output ampilfier means to minimize distortion of said particular tone signal.

6. The tone signal encoder-decoder of claim 5 wherein said output amplifier means includes a transistor having an emitter electrode, said degenerative feedback circuit means including resistance means coupling said emitter electrode to a reference potential, said bypass circuit including a capacitor and diode series coupled from said emitter electrode to said reference potential, and circuit means coupling said first bias circuit means to the junction of said diode and said capacitor.

7. The tone signal encoder-decoder circuit of claim 1 wherein said output circuit of said tone frequency selective means includes output amplifier means having degenerative feedback circuit means coupled thereto, first capacitor means and second diode means coupled in series across said degenerative feedback means to provide a bypass circuit therefor, second capacitor means coupled to said second diode means, circuit means coupling said first bias circuit means to said first and second capacitor means and said second diode means, said operating voltages furnished by said first bias circuit means with the power supply coupled to receiver acting to bias said second diode means to conduction and to charge said first and second capacitor means, whereby said degenerative feedback means is effectively bypassed, said charge on said first and second capacitor means acting to maintain said second diode means conductive during the starting period of said oscillator circuit with the switching means coupling the power supply to the transmitter and said operating voltages furnished by said first bias circuit means are removed from said second diode means, said first and second capacitor means discharging through said second diode means whereby said second diode means is rendered non-conductive and said degenerative feedback circuit means is unbypassed, said unbypassed degenerative feedback circuit means acting to reduce the gain of said output amplifier means to minimize distortion of said particular tone signal.

8. A quick start circuit for an oscillator circuit including in combination, amplifier circuit means forming a portion of the oscillator circuit, said amplifier circuit means including a transistor having an emitter electrode, degenerative feedback circuit means for reducing the gain of said amplifier circuit and including resistance means coupling said emitter electrode to a reference potential, capacitor means and diode means coupled in series across said resistance means to provide a bypass circuit therefor, switching circuit means coupled to the oscillator circuit and said diode means, said switching means acting to switch the oscillator circuit between operative and inoperative states, bias circuit means coupled to said switching circuit means for applying a first bias potential thereto, said switching circuit means acting to apply said first bias potential to said diode means with the oscillator circuit in an inoperative state and to remove said first bias potential from said diode means with the oscillator in an operative state, said first bias potential acting to charge said capacitor means to a second bias potential whereby said diode means is biased to conduction and said degenerative feedback circuit means is bypassed, said charge on said capacitor means acting to maintain said diode means conductive during the starting period of the oscillator circuit with said first bias potential removed from said bias circuit means, said charge on said capacitor means further discharging through said diode means whereby said second bias potential is reduced to a value where said diode means is substantially non-conductive and said regenerative feedback circuit means becomes unbypassed and acts to reduce the gain of said amplifier circuit means.

9. The quick start circuit of claim 8 wherein said amplifier circuit includes second capacitor means coupled to said diode means and said bias circuit means, said bias circuit means being responsive to said first bias potential to charge said first capacitor means to a second bias potential, and said second capacitor means to a third bias potential whereby said diode means is biased to conduction and said degenerative feedback circuit means is bypassed, said charge on said first and second capacitor means acting to maintain said diode means conductive during the starting period of the oscillator circuit and with said first bias potential being removed from said bias circuit means, said charge on said first and second capacitor means further discharging through said diode means whereby said second and third bias potentials are reduced to values where said diode means is substantially non-conductive and said degenerative feedback circuit means becomes unbypassed and acts to reduce the gain of said amplifier circuit means.

10. A tone signal encoder-decoder circuit for a transmitter-receiver having a power supply and switching means for selectively coupling the power supply to the transmitter and the receiver, the transmitter including a modulator circuit and the receiver including an audio amplifier circuit, which is normally biased to be inoperative, and a discriminator circuit coupled to the audio amplifier circuit and adapted to develop tone signals in response to input signals applied thereto; said tone signal encoder-decoder circuit including in combination, tone frequency selective and amplifying means having an input circuit adapted to be coupled to the discriminator circuit for receiving the tone signals therefrom and an output circuit, feedback circuit means coupling said output circuit of said tone frequency selective and amplifying means to said input circuit thereof, said feedback circuit means including semiconductor switch means for selectively rendering said feedback circuit means operative, detector circuit means coupling said output circuit of said tone frequency selective means to the audio amplifier circuit, said tone frequency selective means being responsive to a particular tone signal to select and amplify the same, said detector circuit means being responsive to said amplified particular tone signal to develop a control voltage therefrom and to apply said control voltage to the audio amplifier to bias the same to be operative, bias circuit means coupled to the switching means for providing bias voltages in accordance with the operation of the switching means, said bias circuit means being coupled to said semiconductor switching means and applying a first bias voltage thereto during operation of the receiver to render said semiconductor switching means in a state of conduction whereby the transmission of said particular tone signals from said output circuit to said input circuit of said tone frequency selective and amplifying means by said feedback circuit means is prevented, said bias circuit means applying a second bias voltage to said semiconductor switching means during operation of the transmitter to render said semiconductor switching means in a state of conduction whereby the feedback circuit means applies said particular tone signals from said output circuit to said input circuit of said tone frequency selective and amplifying means, said tone frequency selective amplifier means and said feedback circuit means acting to form an oscillator circuit to develop said particular tone signal, means connecting said oscillator circuit to the modulator to couple said particular tone signal thereto, whereby the output signal from the transmitter is modulated by the particular tone signal.

11. The tone signal encoder-decoder circuit of claim 10, wherein said tone frequency selective and amplifying means includes a contactless, resonant reed filter unit.

12. The tone signal encoder-decoder circuit of claim 10, wherein said tone frequency selective and amplifying means includes output amplifier means having degenerative feedback circuit means coupled thereto, capacitor means and diode means coupled in series across said degenerative feedback means to provided a bypass circuit therefor, said bias circuit means being coupled to said diode means and applying a third bias voltage thereto during operation of the receiver to render said diode means conductive and to charge said capacitance means, said third bias means being removed during operation of the transmitter whereby said diode means is rendered non-conductive, said capacitance means acting to discharge through said diode means during operation of the transmitter whereby said bypass circuit is operative during the starting period of said oscillator circuit.

References Cited

UNITED STATES PATENTS

| | | | |
|---|---|---|---|
| 2,998,576 | 8/1961 | Cannon | 331—156 X |
| 3,213,390 | 10/1965 | Faith et al. | 331—109 |
| 3,292,085 | 12/1966 | Black | 325—18 |

ROBERT L. GRIFFIN, *Primary Examiner.*

B. V. SAFOUREK, *Assistant Examiner.*

U.S. Cl. X.R.

325—64; 331—109, 156; 340—156